No. 619,281. Patented Feb. 14, 1899.
H. B. CORNISH.
CARBURETER.
(Application filed Oct. 5, 1897.)
(No Model.)

WITNESSES
INVENTOR.
HARRY B. CORNISH.
BY Paul Hawley
HIS ATTORNEYS.

THE NORRIS PETERS CO., PHOTO-LITHO., WASHINGTON, D. C.

UNITED STATES PATENT OFFICE.

HARRY B. CORNISH, OF MINNEAPOLIS, MINNESOTA, ASSIGNOR, BY MESNE ASSIGNMENTS, TO VICTOR J. WELCH, OF SAME PLACE.

CARBURETER.

SPECIFICATION forming part of Letters Patent No. 619,281, dated February 14, 1899.

Application filed October 5, 1897. Serial No. 654,115. (No model.)

*To all whom it may concern:*

Be it known that I, HARRY B. CORNISH, of Minneapolis, in the county of Hennepin and State of Minnesota, have invented certain new and useful Improvements in Carbureters, of which the following is a specification.

My invention relates to improvements in carbureters; and the object of my invention is to provide simple and efficient means for carbureting atmospheric air to produce an inflammable gas which under slightly-varying conditions may be employed for lighting, for heating, and for power purposes.

The particular object of my invention is to improve the carbureter shown and described in United States Letters Patent No. 572,837, granted to E. I. P. Staede December 8, 1896, to simplify and cheapen the construction thereof and greatly increase the efficiency of the same.

My invention consists generally in a carbureter comprising a tank to contain the volatile liquid, in combination with an air chamber or head provided in the lower portion of said tank, and a series of pipes extending through said chamber and having openings within said chamber for the exit of air therefrom, said openings being upwardly inclined, whereby the volatile liquid is drawn from the lower part of said tank, projected upwardly in small streams, and commingled with air; and my invention also consists in details of construction and in combinations of parts, all as hereinafter described, and particularly pointed out in the claims.

The invention will be more readily understood by reference to the accompanying drawings, forming a part of this specification, and in which—

Figure 1:
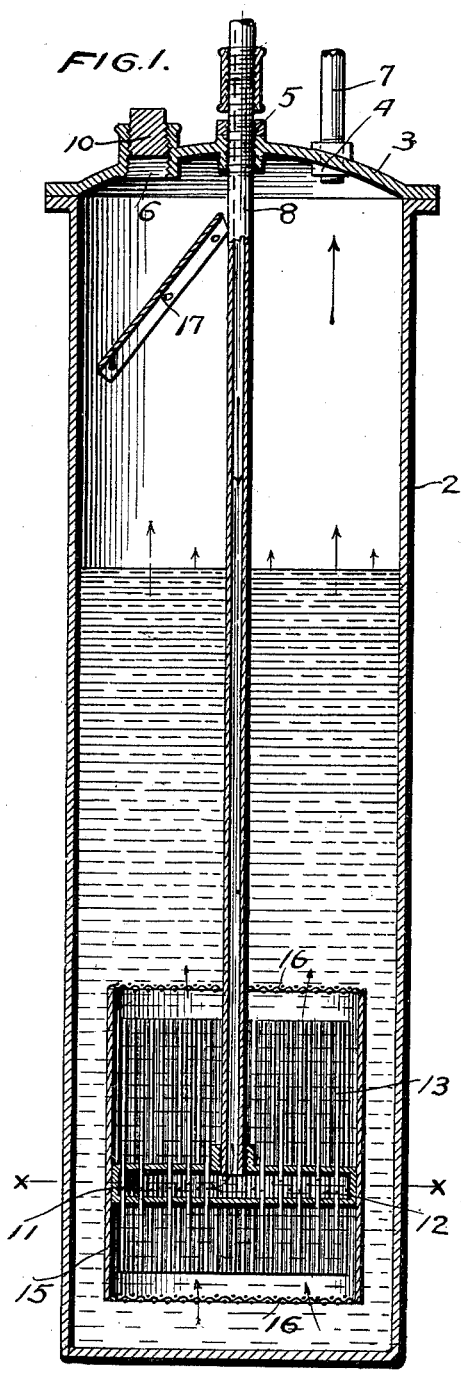
Figure 2:
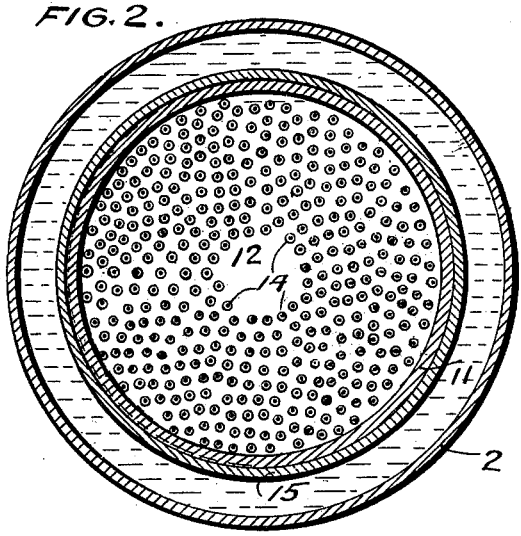
Figure 4:
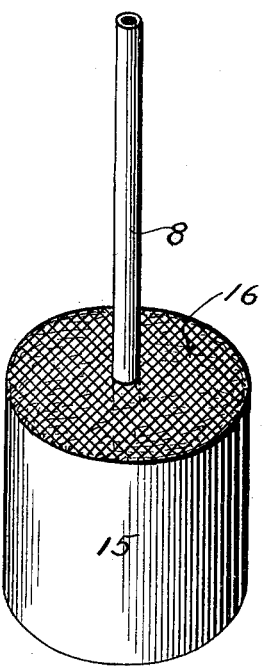
Figure 3:
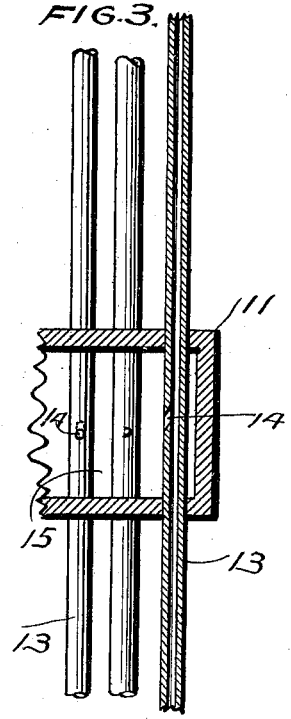

Figure 1 is a vertical section of a carbureter embodying my invention. Fig. 2 is an enlarged horizontal section thereof on the line *x y* of Fig. 1. Fig. 3 is a vertical sectional detail, still further enlarged, showing the air-injector openings in the mixing-pipes; and Fig. 4 is a perspective view of the mixer or carbureting device.

As shown in the drawings, 2 represents a tank, preferably of considerably greater height than diameter. The upper end of this tank is closed by a removable head 3, that is provided with holes 4, 5, and 6 for the gas-pipe 7, the air-pipe 8, and the gasolene-inlet, respectively. The latter is preferably closed by an easily-removable plug 10. The air-pipe 8 extends downward through the center of the tank and at a point near the bottom of the tank 2 is provided with an air chamber or head 11. This chamber is preferably a cored casting containing a low cylindrical chamber 12, with which the pipe 8 communicates. The head is drilled through and through. The small pipes 13 are passed through the holes therein in the thin head and stand erect, with their upper and lower ends open. The pipes are soldered or brazed in the head or otherwise finished to prevent the leakage of air around them. Each pipe is provided with a small hole 14 in that part of the pipe which is within the chamber 12. The hole 14 is drilled in the pipe at an angle of about forty-five degrees to the axis of the pipe and leads upward, so that the air which enters the chamber under pressure is directed upwardly through the inclined holes 14 in the several pipes 13, with the result that the fluid from the lower part of the tank is rapidly raised into and forced upward through the small pipes, where, being confined with the air, the air is thoroughly impregnated with the volatile liquid vapor. The vertical positions of the pipes permit of the use of a very large number thereof within a small space, so that the generator or carbureter is of a correspondingly high capacity as compared with the devices of a like character. The pipes or tubes are of such length that the air and the fluid are confined long enough to secure a perfect mixture. Surrounding and protecting the head and the group of mixing pipes or tubes is a tube or cylinder 15, open at its upper and lower ends, and impurities are prevented from entering and clogging the pipes by means of gauze 16, provided in the ends of the cylinder 15. When the tank is filled with gasolene through the hole 9, the gasolene falls upon the plate or deflector 17 in the upper part of the tank and is directed down the side of the tank instead of falling upon the gauze top 16 and the open ends of the mixing pipes or tubes 13.

The advantages of my carbureter arise from the confinement of the air and fluid in small quantities, the free and unobstructed and natural passages for the air and fluid, the constant removal and utilization of the heavier portions of the gasolene or like fluid, which portions naturally sink to the bottom of the tank, the ability to make gas until the body of fluid is practically exhausted, the simplicity of the parts, freedom from the liability to clog and become inoperative, the cheapness of construction, and the compactness and yet large working capacity of the carbureter proper.

It is obvious that the construction of my carbureter may be modified to a considerable extent without departing from the spirit of my invention, and I therefore do not confine my invention to the specific construction herein shown and described.

Having thus described my invention, I I claim as new and desire to secure by Letters Patent—

1. A carbureter comprising, in combination, a tank to contain the volatile liquid, a closed chamber arranged in the lower part of said tank, means for conducting air to said chamber, a series of straight pipes extending through said chamber and having open ends above and below said chamber, and having upwardly-inclined openings within said chamber, for the purpose set forth.

2. A carbureter comprising, in combination, a tank to contain the volatile liquid, a closed chamber arranged in said tank, a series of straight pipes extending through said chamber and having open ends arranged above and below said chamber, each of said pipes being provided with an air-inlet opening arranged within said chamber, for the purpose set forth.

In testimony whereof I have hereunto set my hand this 2d day of October, A. D. 1897.

HARRY B. CORNISH.

In presence of—
C. G. HAWLEY,
G. TITSWORTH.